United States Patent [19]
Zehnpfennig

[11] 4,128,337
[45] Dec. 5, 1978

[54] METHOD OF AND APPARATUS FOR INTERFEROMETRIC BACKGROUND SUPPRESSION

[75] Inventor: Theodore F. Zehnpfennig, Wayland, Mass.

[73] Assignee: Visidyne, Inc., Burlington, Mass.

[21] Appl. No.: 806,199

[22] Filed: Jun. 13, 1977

[51] Int. Cl.² .............................................. G01B 9/02
[52] U.S. Cl. ..................................... 356/346; 356/307
[58] Field of Search .............................. 356/106 S, 82

[56] References Cited

U.S. PATENT DOCUMENTS

| | | | |
|---|---|---|---|
| 3,588,252 | 6/1971 | Habosian | 356/82 |
| 3,753,619 | 8/1973 | Thorpe et al. | 356/106 S |
| 4,009,962 | 3/1977 | Lauer | 356/106 S |
| 4,029,416 | 6/1977 | Hawes | 356/106 S |

Primary Examiner—Conrad J. Clark
Attorney, Agent, or Firm—Joseph S. Iandiorio

[57] ABSTRACT

A method of detecting a small elemental spectral source in a larger, spectral background, including producing a first interferogram of each element of an object area including the source and background; producing a second complementary interferogram of each element of that object area; projecting onto a detector images of the first and second interferograms and defocussing one of the first and second interferograms for providing a fluctuating elemental interferogram output from each element of the detector which receives an interferogram derived from the element of the object area that contains a source which spectrally distinguishes from the background, while reducing the output corresponding to each element containing no source to a constant and non-fluctuating level.

2 Claims, 10 Drawing Figures

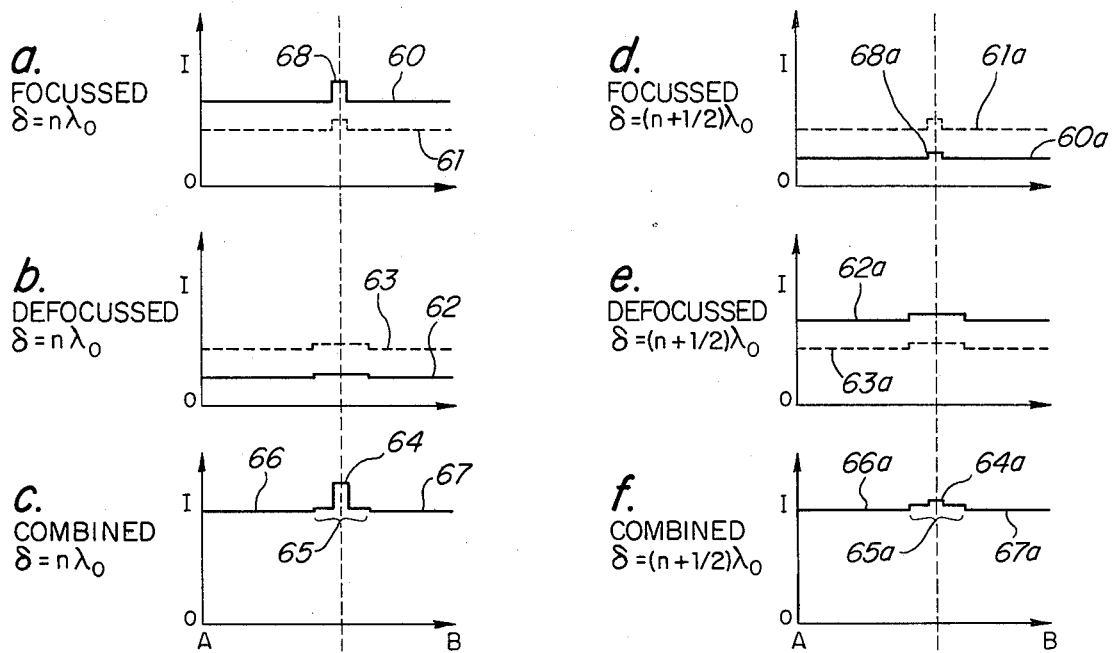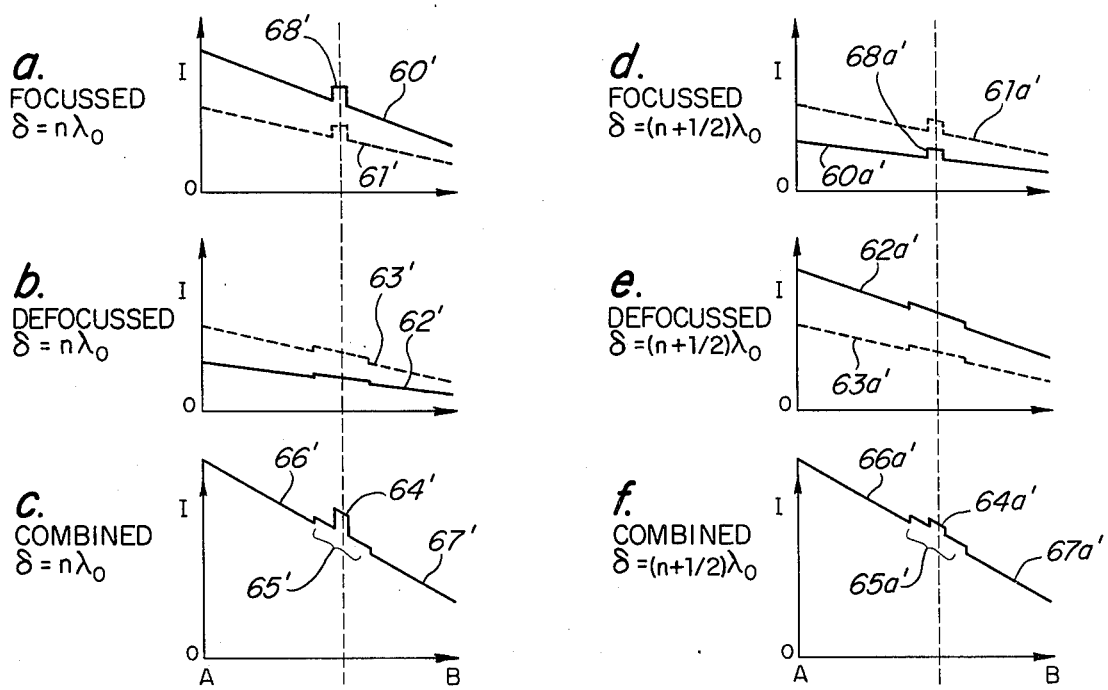
FIG. 3.
FIG. 4.
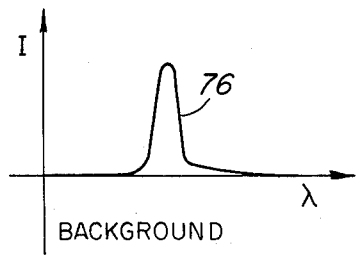
FIG. 6.
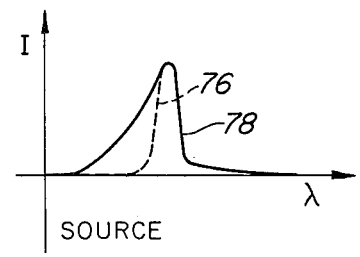
FIG. 7.

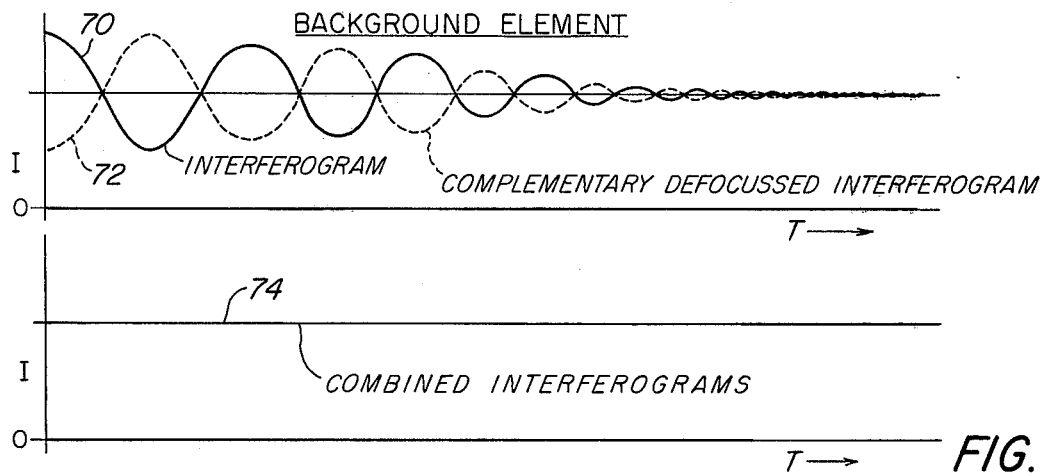
FIG. 5.
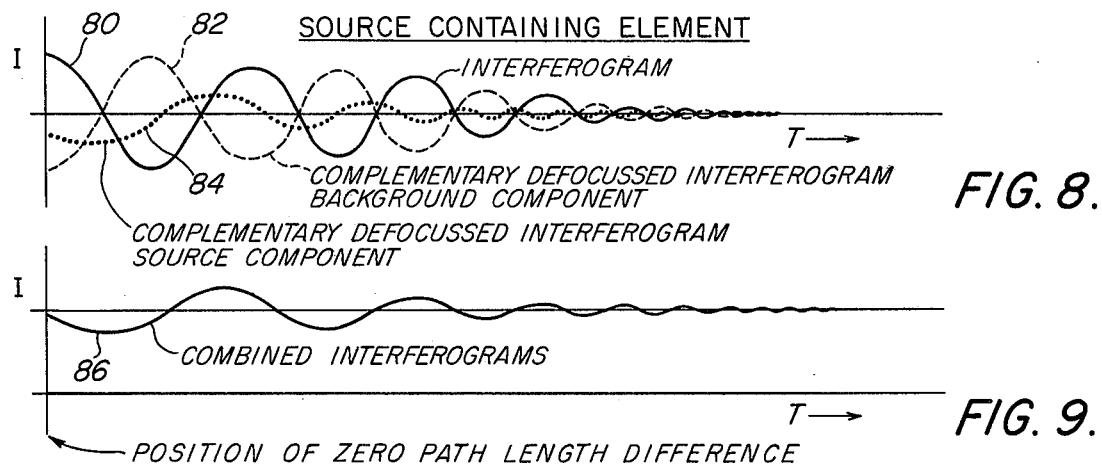
FIG. 8.
FIG. 9.
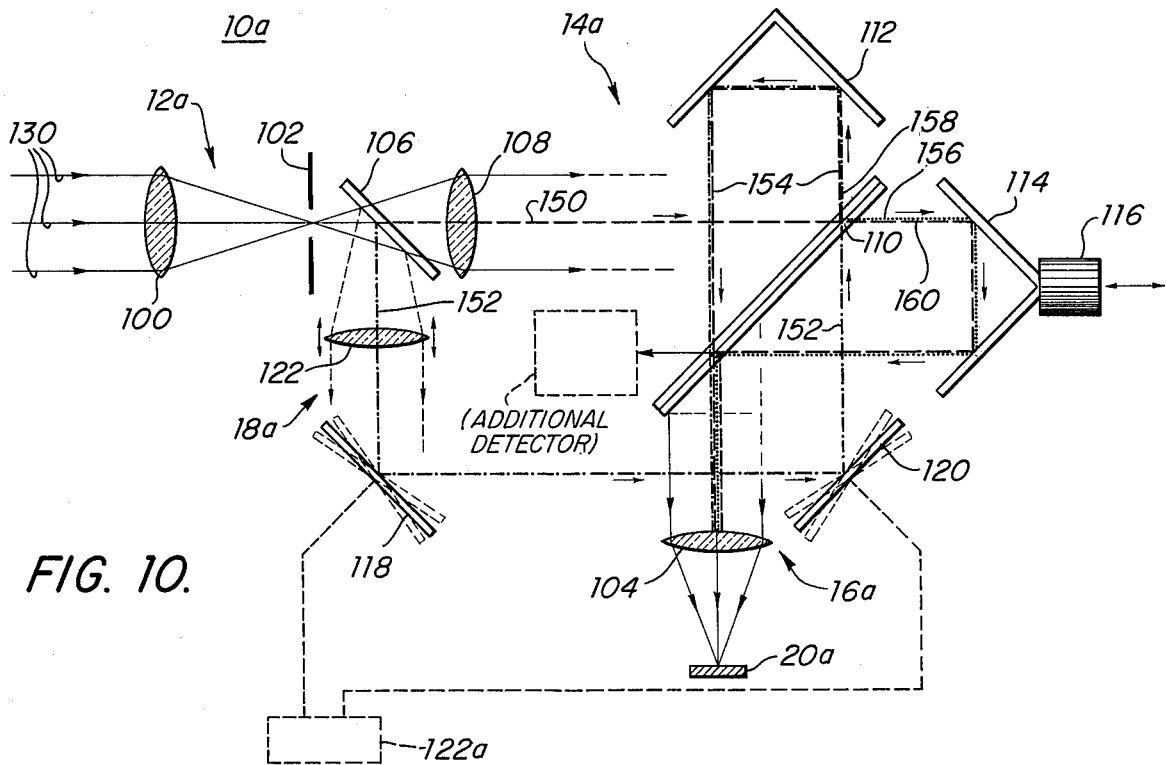
FIG. 10.

METHOD OF AND APPARATUS FOR INTERFEROMETRIC BACKGROUND SUPPRESSION

FIELD OF INVENTION

This invention relates to a method of interferometric background suppression and to a system for accomplishing same, and more particularly to such a method and apparatus for suppressing background and detecting against that background a source comparable in size to the resolution element of the optical system.

BACKGROUND OF INVENTION

Dual-beam interferometers are used for spectral analysis of a gas sample contained in a standardized chamber. A first beam of electromagnetic radiation is projected into the gas to be analyzed in a first chamber and then is projected to the interferometer, which creates an interferogram on a detector. A complementary second beam projected through a second identical but empty chamber is also submitted to the interferometer, which creates an interferogram of it on the detector. Thus any spurious background spectral signal variations derived from the first chamber are combined with those derived from the second, thereby eliminating these variations and leaving only the spectral signal variations derived from the gas.

More recently, it has been suggested to use interferometers to provide, on a detector having a multitude of cells, interferograms of an object area in attempting to locate a source of radiation in the object area that differs only slightly spectrally, and usually not more than slightly in intensity, from the background of the object area. For example, the background may have an emission band of 2.95 - 3.05$\mu$, while the source has an emission band of 2.90 - 3.05$\mu$. The source is expected to be a point-like object being comparable in size to a spatial resolution element of the optical system and appears contrasted against a smoothly varying background which is often spectrally similar to the source. Each cell on the detector may represent an object area of 300 meters radius, while the source, for example, is but 50 meters in radius or approximately 3% of the area. Nevertheless, it is desired to identify that cell corresponding to the object area containing that small source, 3% of the object area, for further processing. According to one conventional technique to effect this, the output from each cell is submitted to a device such as a computer, which takes the Fourier transforms of the interferogram output of each cell to determine the spectrum of the output of each cell. If the analysis shows that a cell has the band 2.90 - 3.05$\mu$ instead of the expected 2.95-3.05$\mu$, then the object area corresponding to that cell contains the source sought. However, this is a time-consuming, expensive technique, since each cell in a multicell detector containing perhaps $10^4$ to $10^6$ cells must be processed. It would thus be quite advantageous to be able to select for further processing only those cells most likely to contain information including the sought spectral characteristic. Unfortunately, in such applications the background is typically a portion of the earth's surface or other area not accurately enough reproducible for use as a complementary image to enable the background to be offset and eliminated in the manner suggested previously with dual-beam interferometer gas analyzers.

SUMMARY OF INVENTION

It is an object of this invention to provide an improved, simple and inexpensive method for suppressing background information from a field of data.

It is a further object of this invention to provide such a method particularly suitable for use with an interferometer.

It is a further object of this invention to provide such a method which is easily optically performed.

It is a further object of this invention to provide an apparatus for performing the method.

The invention results from the realization that by providing to a detector complementary and defocussed interferograms of each element of an image of an object area, the defocussed elemental interferogram containing the special spectral characteristic of a sought radiation source is distributed or smeared over a number of neighboring areas or cells of the detector, so that the discrete, focussed, elemental interferogram of the sought radiation source finds no offsetting equivalent in the corresponding defocussed elemental interferogram and remains distinguishable against the offsetting complementary background, and that therefore a point-like or single-element source is thereby detectable against even a smoothly varying background even though the background may be spectrally similar to the source.

This invention features a method for detecting a small elemental source in a larger spectral background for interferometric suppression of the background. The method includes producing a first interferogram of each element of an object area including the source and background, and producing a second complementary interferogram of each element of that object area. Images of the first and second interferograms are projected onto a detector. One of the first and second interferograms is defocussed in order to provide a fluctuating elemental interferogram output from each element of the detector, which receives an interferogram derived from an element of the object area that contains a source which spectrally distinguishes from the background, while reducing the output corresponding to each element containing no source to a constant and non-fluctuating level.

Apparatus for implementing this method includes a dualbeam interferometer for producing first and second complementary interferograms of each element of an object area including the source and background. There are means for projecting onto a detector images of the first and second interferograms and means for defocussing one of the first and second interferograms for providing a fluctuating elemental interferogram output from each element of the detector which receives an interferogram derived from an element of the object area that contains a source which spectrally distinguishes from the background.

The images provided to the detector may be formed: at the output of the interferometer; or at the input to the interferometer, so that at least part of the interferometer works with the focussed and defocussed images; or the images may be begun to be formed at the input to the interferometer but only finally formed beyond the interferometer at the detector.

DISCLOSURE OF PREFERRED EMBODIMENT

Other objects, features and advantages will occur from the following description of a preferred embodiment and the accompanying drawings, in which.

Figures 1, 2:
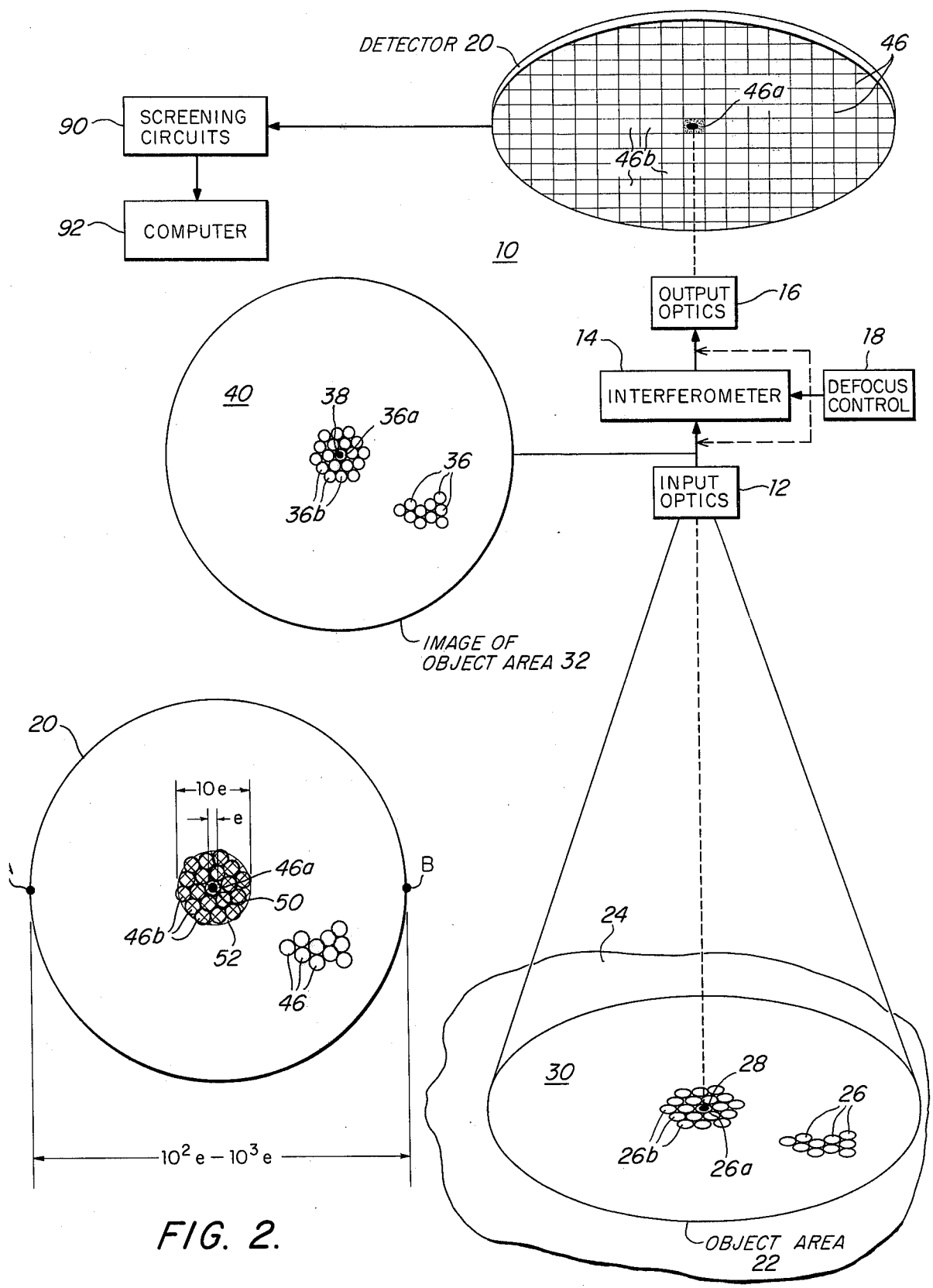
FIG. 1 is a schematic diagram illustrating generally apparatus for background suppression in interferometric analysis according to this invention.
FIG. 2 is an enlarged plan view of a detector, superimposed on which are a focussed and a defocussed complementary interferogram derived from an image element containing a source whose spectral characteristic differs from the background.

FIGS. 3a, b, c, d, e, and f are a graphical illustration of the intensity variation across the face of the detector in FIG. 2 for a particular wavelength source against a uniform intensity background, when the focussed interferogram, the complementary defocussed interferogram, and both interferograms are projected onto a detector;

FIGS. 4a, b, c, d, e, and f are a graphical illustration similar to that shown in FIG. 3 for the case in which the background intensity of the object area is not uniform, but varies smoothly or linearly;

FIG. 5 is a graphical illustration of a typical interferogram and complementary defocussed interferogram for a uniform background, and of those two interferograms combined;

FIG. 6 shows the spectral characteristic of the background;

FIG. 7 shows the spectral characteristic of a source to be identified;

FIG. 8 is a graphical illustration of a source component and the background component of a complementary defocussed interferogram;

FIG. 9 is a graphical illustration of the combination of the interferograms of FIG. 8; and FIG. 10 is a detailed schematic diagram of an apparatus, such as shown in FIG. 1, according to this invention.

The method of this invention relates to the defocussing of one interferogram image of the object area while leaving the other sharply in focus, so that a detector, typically including a multiplicity of cells, receives an interferogram of the image of the object area and a complementary defocussed interferogram of the image of the object area. If the background is either uniform or a smoothly varying function of position, its defocussed image does not differ much from its focussed image, and the same is true of their respective interferograms. The combining of the sharply focussed interferogram of the background with the complementary defocussed interferogram of the background results in effective suppression of the background at each point across the face of the detector. However, if the source to be detected is a point or at least of small angular extent, e.g. a spatial resolution element or cell of the optical system, its sharp image differs strongly from its defocussed image; thus the interferogram of the source will not be suppressed. Herein by suppression is meant the result of combining two signals whose sum is a constant or d.c. level.

A combination of the focussed interferogram and a complementary defocussed inteferogram results in a high level of intensity derived from the focussed image interferogram, which varies in accordance with the fluctuations of the spectrally distinct source. Surrounding this is a halo of much lower-level intensity which also varies complementarily. These lower-level fluctuations, as well as other noise-generated fluctuations, are elminated using a screening circuit or some sort of thresholding device. Defocussing may be accomplished with an additional mirror or lens means, by wobbling one or more of the existing mirrors in the path taken by the second image through the interferometer, or by displacing an existing lens. Also, the effect of defocussing can be simulated by designing into the optical system a controlled amount of spherical aberration, by making the entrance aperture annular in shape, or by adding a filter to the entrance aperture whose transmittance varies as a function of the radial distance from the optical axis. The defocussing may be performed before, during, or after the beam exits the interferometer. However, in order to avoid defocussing both sets of interferograms equally, the beams must be kept separated in their passage through the interferometer. If maintaining collimation is a requirement, the defocussing lens means may be eliminated and the defocussing may be simulated by rapidly wobbling one or more of the mirrors in the path through the interferometer of the beam to be defocussed. This keeps the defocussed beam always in collimation, but if the integration time of the detector and the subsequent electronics are long compared to the wobble period the secondary beam would in fact appear to be defocussed.

The method of suppressing the background data in interferometer analysis may be accomplished by generating the first interferogram of an object area and generating a second complementary interferogram of that same object area. Subsequently, an image of the first interferogram of each element is produced and projected onto a detector. An interferogram of the object area necessarily contains and is made up of each interferogram of each element of the image. Thus while an interferogram of the entire object area is present on the face of the detector there is also there present on each cell of the detector an interferogram of each element of the object area. A second defocussed complementary interferogram of each element is produced and is projected onto the same detector with the first interferogram. This provides a fluctuating elemental interferogram output from each area or cell of the detector which receives an interferogram derived from an element that contains a source, which spectrally distinguishes from the background.

Interferometer system 10, FIG. 1, includes input optics 12, dual-beam interferometer 14, output optics 16, defocus control 18, and detector 20. Defocus control 18 may introduce the defocus function either before, during, or after the interferometer 14. Input optics 12 views on ground 24 an object area 22, illustrated as composed of a multiplicity of elemental areas 26 which are the smallest portions of object area 22 that are resolvable by input optics 12. One particular elemental area 26a contains a source 28 whose spectral characteristic differs from that of the surrounding background 30 contained in all the remaining elemental areas 26, including elemental areas 26b, closely surrounding elemental area 26a.

Input optics 12 forms of object area 22 an image 32, which it presents to interferometer 14. Image 32 as illustrated includes a plurality of elements 36 including element 36a, which includes the image 38 of a source 28 and surrounding elements 36b, which, along with the rest of elements 36, are composed of the general uniform background 40; elements 36, 36a and 36b correspond to the elemental areas 26, 26a and 26b, FIG. 1. Image 32, sharply focussed, is fed to interferometer 14, which produces an elemental interferogram for each image element 36, which interferograms are projected by output optics 16, onto corresponding cells 46 of detector 20, forming an interferogram of the whole image 32. Cell 46a corresponding to element 36a receives the interferogram, which is a function of the background plus the source, whereas the remaining cells 46, including cells 46b closely surrounding cell 46a, receive interferograms which are a function of only the background.

Although in this specific embodiment the input optics 12 form an image 32 of the object area 22 which is then presented to the interferometer, this is not a necessary limitation on the apparatus or the method of this invention. For example, the input optics may be such that they form an image of the object area, but that image is not formed until the radiation reaches detector 20. Or, the input optics may be eliminated and the image formed of the interferogram only after the radiation emerges from the interferometer. Simultaneously, with the projection onto detector 20 of the elemental interferograms derived from sharply focussed image 32, are complementary interferograms derived from the complementary but defocussed version of image 32. This is illustrated in FIG. 2, wherein the focussed image 32 produces an elemental interferogram in the area 50 of cell 46a, whereas the defocussed complementary image results in the interferogram being spread over a larger area 52, which covers a number of cells 46b. Typically each cell 46, including cells 46a and 46b, may be understood as having a diameter e, whereas the broadened area 52 produced by the defocussed image has a diameter of approximately 10e and the overall diameter of detector 20 is anywhere from 100e to 1000e. Thus the interferogram from the sharply focussed image provides the information from source 28 in combination with some background information in area 50, FIG. 2, coinciding with cell 46a. However, the defocussed complementary image takes the information from each element 36, FIG. 1, and distributes it over a number of neighboring elements 36b so that area 50 is spread out to a much enlarged area 52, thereby dispersing the specific spectral characteristic of source 28 into a large number of interferograms in a large number of cells 46b, FIG. 2. Therefore the combination of the two interferograms, the focussed and the complementary defocussed, produce a combined interferogram which minimizes the effect of the source 28 in the defocussed form but not the focussed form, while suppressing the background, thereby making most salient the focussed representation of the source.

Assume that the background is uniform from A to B across the face of the detector 20, FIG. 2, and that the movable mirror of the interferometer, e.g. corner mirror 114, FIG. 10, discussed infra, be fixed at one of the positions which gives an optical path length difference d which is an integral number of wavelengths. That is $d = n\lambda_o$, where n is an integer and $\lambda_o$ is the average wavelength of the optical passband in which the interferometer is operating. With a sharply focussed primary image and a defocussed complementary image, a condition of construction interference exists in the focussed image and destructive interference in the defocussed image. Thus, the peak 68 of intensity profile 60 from A to B in the sharply focussed image is higher than the average sharply focussed intensity profile 61, as shown in FIG. 3a. The average profile 61 is the time-averaged profile which is observed when the movable mirror is scanned through its range of motion. In contrast, the intensity profile 62 in the defocussed image is lower than its corresponding average profile 63 because of destructive interference, FIG. 3b. FIG. 3c shows the sum of the intensity profiles in the focussed and defocussed images. The peak 64 corresponds to the sharply focussed portion of the image derived from source 28. The broader, lower intensity region 65 corresponds to the defocussed image of the source. Regions 66 and 67 are areas of the image which correspond to background regions of the object.

If the movable mirror be shifted to one of the positions where the optical path length difference d is not an integral number of wavelengths, such as $d = (n + 1/2) \lambda_o$, the conditions of constructive and destructive interference are interchanged, with destructive interference in the sharply focussed image and constructive interference in the defocussed image. Thus, the intensity profile 60a in the focussed image is lower than the average focussed profile 61a, as shown in FIG. 3d. Since all levels in the profile are reduced by the same factor, the peak 68a corresponding to the source does not stand out against the background as much as it did in FIG. 3a. In contrast, the intensity profile 62a in the defocussed image is now higher than the corresponding average profile 63a as shown in FIG. 3e. FIG. 3f shows the sum of the intensity profiles in the focussed and defocussed images for $d = (n + 1/2) \lambda_o$.

Comparing FIGS. 3c and 3f, it is seen that the intensity of the sharply focussed image 64, 64a of the source has decreased and the defocussed image 65, 65a of the source has increased. In contrast, the intensity of the background regions 66, 67; 66a, 67a is unchanged. Thus, as the scanning mirror is moved through successive positions giving path length differences which are integral and non-integral numbers of wavelengths, the combined images of the source fluctuate in intensity, giving an interferogram of the source. The combined images of regions of the object occupied by background, however, have been reduced to a DC level.

In the event that the background is not constant, but varies linearly across the face of the detector, the same result occurs, as shown in FIGS. 4a, b, c, d, e, and f, where like parts have been given like reference numerals and letters primed with reference to FIG. 3. In the event that the background does not vary linearly over the whole field of view, but still is approximately linear in local regions of the field of view, the background is still effectively reduced to a DC level.

The interferogram produced for any particular background element is generally a diminishing sinusoidal curve 70, FIG. 5. However, at the same time the complementary defocussed interferogram superimposed on the first interferogram is a second sinusoidal wave form 72 which is equal, opposite and diminishing in precisely the same way, but as a mirror image, of curve 70. The result of these two equal and opposite interferograms is an offsetting that results in the combined interferogram ideally being a simple DC level 74. The typical spectral characteristic 76 of such a background element is shown in FIG. 6, while a typical spectral characteristic for a source 78 to be found is depicted in FIG. 7, superimposed on a background spectral characteristic 76.

With respect to a source containing element, the interferogram is a generally diminishing sinusoidal curve 80, FIG. 8. Typically, any element of the image containing a source includes but a small portion, perhaps 5% or less, which actually reflects the source spectrum, while the remaining 95% reflects the uniform background spectrum. Thus the complementary defocussed interferogram formed from the background component, as illustrated by curve 82, is by far the largest component, while the complementary defocussed interferogram source component, as illustrated by curve 84, is much smaller and out of phase with respect to both curves 80 and 82. Thus while the complementary defocussed interferogram background component suppresses most of the focussed interferogram it does not suppress all of it. The remaining portion of the focussed interferogram then, in combination with the complementary defocussed interferogram source component, combines to produce interferogram, curve 86, FIG. 9, which is not a DC level as with the background elements, but is a fluctuating curve which may be easily recognized by conventional screening circuits 90, FIG. 1. These screening circuits suppress noise and other spurious signals and seek out for submission to computer 92 only those interferogram outputs from cells 46 of detector 20 which have fluctuations exceeding some predetermined level whereby interferograms such as curve 86 may be recognized for forwarding to a conventional computer 92, which performs Fourier analysis in the usual fashion.

The invention may be embodied in a system 10a, FIG. 10, including input optics 12a, interferometer 14a, output optics 16a, detector 20a, defocus control 18a. Input optics 12a may include an objective lens 100 and field stop 102, while output optics 16a may include a lens 104. Interferometer 14a may include a beam splitter 106, lens device 108, beam splitter 110, fixed retroreflector 112, and movable retroreflector 114 driven by solenoid 116; mirrors 118 and 120 complete the interferometer. Defocus control 18a may include a focussing lens system 122 or alternatively may include some means 122a for wobbling mirror 118 or mirror 120, or both. Defocus control 18a may act before, in, or after interferometer 14a. In operation, radiation 130 from object area 22 is received by lens 100 and directed to beam splitter 106, which transmits a portion of the radiation 150 through and reflects another portion 152. Radiation 150 which passes through beam splitter 106 then passes through lens 108 and strikes beam splitter 110. One portion of this radiation 154 is reflected up to fixed retroreflector 112 around and down through a second portion of beam splitter 110 to lens 104. A second portion 156 is transmitted through beam splitter 110 and strikes moveable retroreflector 114, where it is turned back to once again strike beam splitter 110 and be reflected to lens 104. The motion of retroreflector 114 by means of solenoid 116 causes interference between radiation 156 and 154, which produces an interference pattern or interferogram that is projected by lens 104 onto detector 20a, creating the focussed interferogram, the interferogram derived from the sharply focussed image. The other portion 152 of the incident radiation 130 is directed through the defocussing device 122 and then to mirror 118, whereupon it is again reflected to mirror 120 and once again to beam splitter 110. At this point, radiation 152 splits up into two portions 158 and 160. Portion 158 is transmitted through beam splitter 110 around fixed reflector 112 back through the second portion of beam splitter 110 to lens 104, while radiation 160 reflects from beam splitter 110, is reflected around moveable retroreflector 114 back to beam splitter 110, where it is once again reflected to lens 104. Upon its reflection by moveable retroreflector 114, the phase of radiation 160 is varied with respect to radiation 158 in the same way that the phase of radiation 156 is varied with respect to that of radiation 154. The resulting interference pattern or interferogram is projected by lens 104 onto detector 20a, and provides the complementary defocussed interferogram, which is superimposed on the focussed interferogram. A complementing of the second radiation 152 and its two parts 158 and 160 is accomplished inherently by virtue of beam splitter 110 which characteristically is a thin film dielectric layer deposited on a transparent substrate.

Other embodiments will occur to those skilled in the art and are within the following claims:

What is claimed is:

1. A method of detecting a small elemental spectral source in a larger spectral background by interferometric suppression of the background comprising: producing first and second complementary interferograms of each element of that object area; projecting onto a detector images of said first and second interferograms; and, defocussing one of said first and second interferograms for providing a fluctuating elemental interferogram output from each element of said detector which receives an interferogram derived from an element of said object area that contains a source which spectrally distinguishes from the background, while reducing the output corresponding to each element containing no source to a constant and non-fluctuating level.

2. Apparatus for detecting a small, elemental spectral source in a larger spectral background by interferometric suppression of the background comprising: a dual-beam interferometer for producing first and second complementary interferograms of each element of an object area including the source and background; means for projecting onto a detector images of said first and second interferograms; and means for defocussing one of said first and second interferograms for providing a fluctuating elemental interferogram output from each element of said detector which receives an interferogram derived from an element of said object area that contains a source which spectrally distinguishes from the background, while reducing the output corresponding to each element containing no source to a constant and non-fluctuating level.

* * * * *